United States Patent [19]

Ichizawa et al.

[11] Patent Number: 4,819,785
[45] Date of Patent: Apr. 11, 1989

[54] DEVICE FOR SUPPLYING PIECES FOR BLOW-MOLDING CONTAINERS

[75] Inventors: Yoshiyuki Ichizawa, Sohka; Tsugio Nomoto, Higashi Kurume, both of Japan

[73] Assignee: Yoshino Kogyosho Co., Ltd., Tokyo, Japan

[21] Appl. No.: 668,186

[22] Filed: Nov. 5, 1984

Related U.S. Application Data

[63] Continuation of Ser. No. 396,263, Jul. 8, 1982, abandoned, which is a continuation of Ser. No. 253,290, Apr. 13, 1981, abandoned, which is a continuation of Ser. No. 37,058, May 8, 1979, abandoned.

[51] Int. Cl.$^4$ .............................................. B65G 47/24
[52] U.S. Cl. .................................... 198/404; 198/389; 198/470.1
[58] Field of Search ............... 198/389, 391, 396, 403, 198/404, 480, 482, 438, 478, 479, 466, 572, 575, 755, 771, 470.1, 474.1, 476.1, 464.3, 471.1

[56] References Cited

U.S. PATENT DOCUMENTS

| | | | |
|---|---|---|---|
| 1,757,211 | 5/1930 | Parker . | |
| 2,609,943 | 9/1952 | Winder | 198/479 |
| 3,127,210 | 3/1964 | Schreiber | 198/403 |
| 3,319,764 | 5/1967 | Gamberini | 198/404 |
| 3,490,575 | 1/1970 | Herrmann | 198/404 |
| 3,982,625 | 9/1976 | Wentz et al. | 198/572 |
| 4,391,372 | 7/1983 | Calhoun | 198/438 |

Primary Examiner—Joseph E. Valenza
Attorney, Agent, or Firm—Parkhurst, Oliff & Berridge

[57] ABSTRACT

Cylindrical plastic pieces (i.e., preforms) each with a bottom are supplied one by one to jigs circulated through the heating and blowing mold of a biaxial-orientation blow-molding machine. The pieces are formed of polyethylene terephthalate material to obtain transparent thin-walled bottle-shaped containers, and are formed in cylindrical shape each with a semispherical bottom and a prefinished neck portion molded simultaneously in large number by an injection molding machine. The device for supplying the pieces has a piece aligning unit for temporarily retaining the pieces molded simultaneously by the injection molding machine and accumulated in various orientations at random and exhausting the pieces one by one therefrom to meet the molding velocity of a blow-molding machine, a rope conveyor for sequentially conveying the pieces exhausted from the piece aligning unit in a neck portion upward position as suspended therefrom, a piece inverting mechanism for attracting and holding the pieces conveyed via the rope conveyor and inverting the pieces to neck portion downward position during the turning operation of the pieces at substantially 180° in a horizontal plane, a jig feeding mechanism for feeding jigs circulated at the heating and blowing mold of the blow-molding machine at predetermined pitch to the vicinity of the piece inverting mechanism, and a piece inserting mechanism for clamping the piece attracted and held by the piece inverting mechanism via a pair of clamp pawls and downwardly moving the piece while stepwisely rotating the piece substantially at 90° in a horizontal plane thereby to insert the piece into the jig of the jig feeding mechanism.

9 Claims, 7 Drawing Sheets

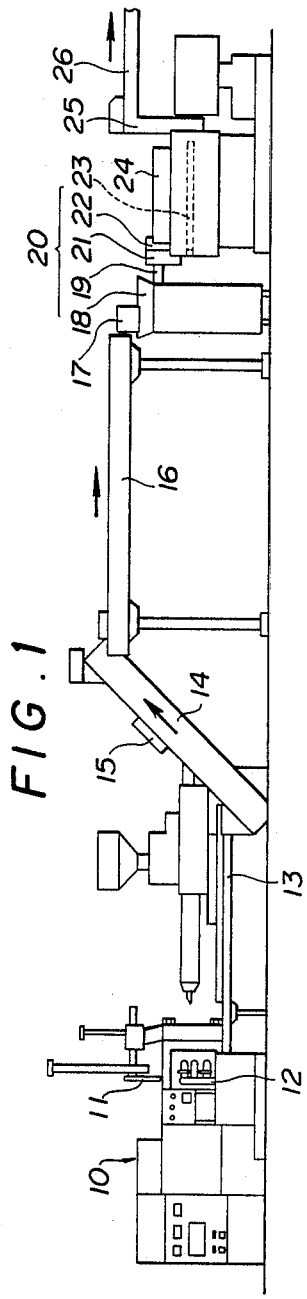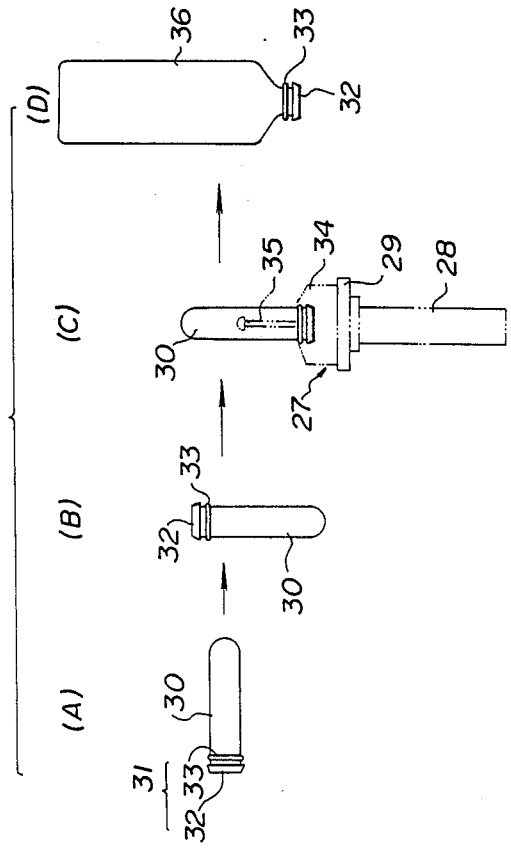
FIG. 1
FIG. 2

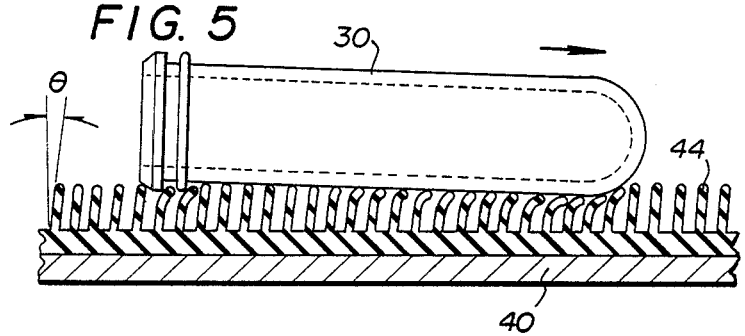
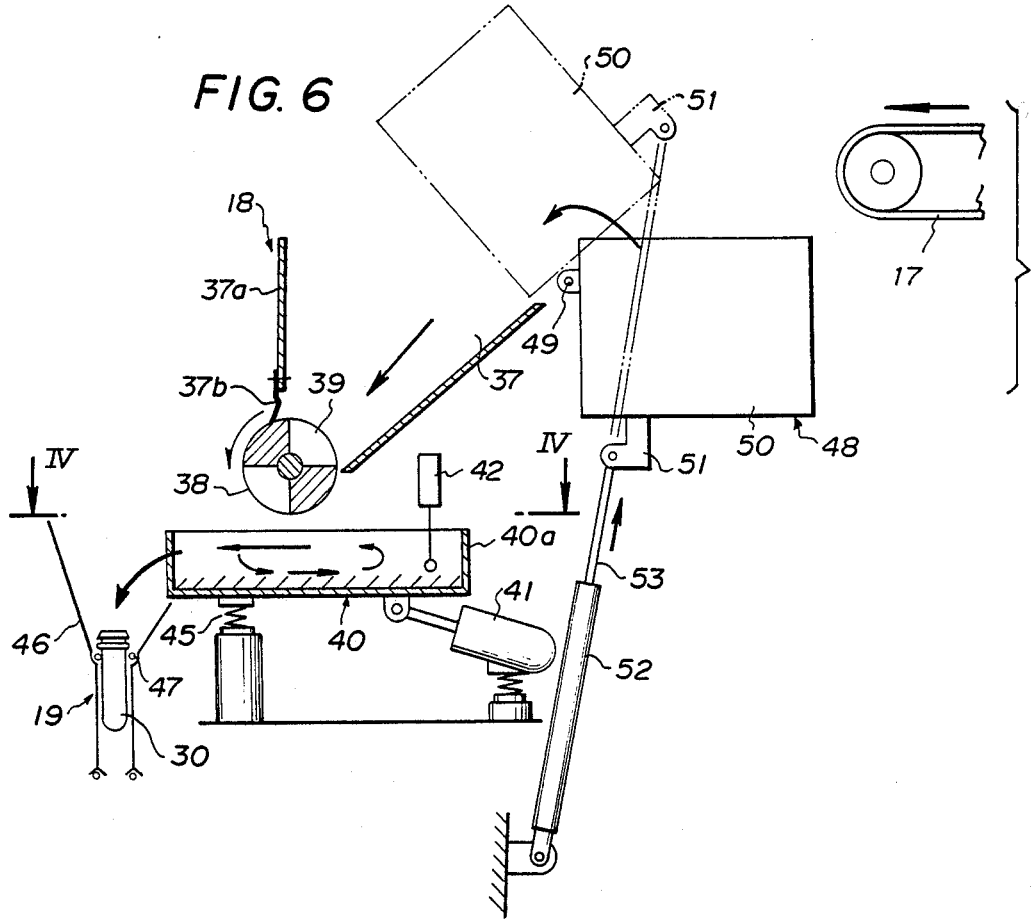

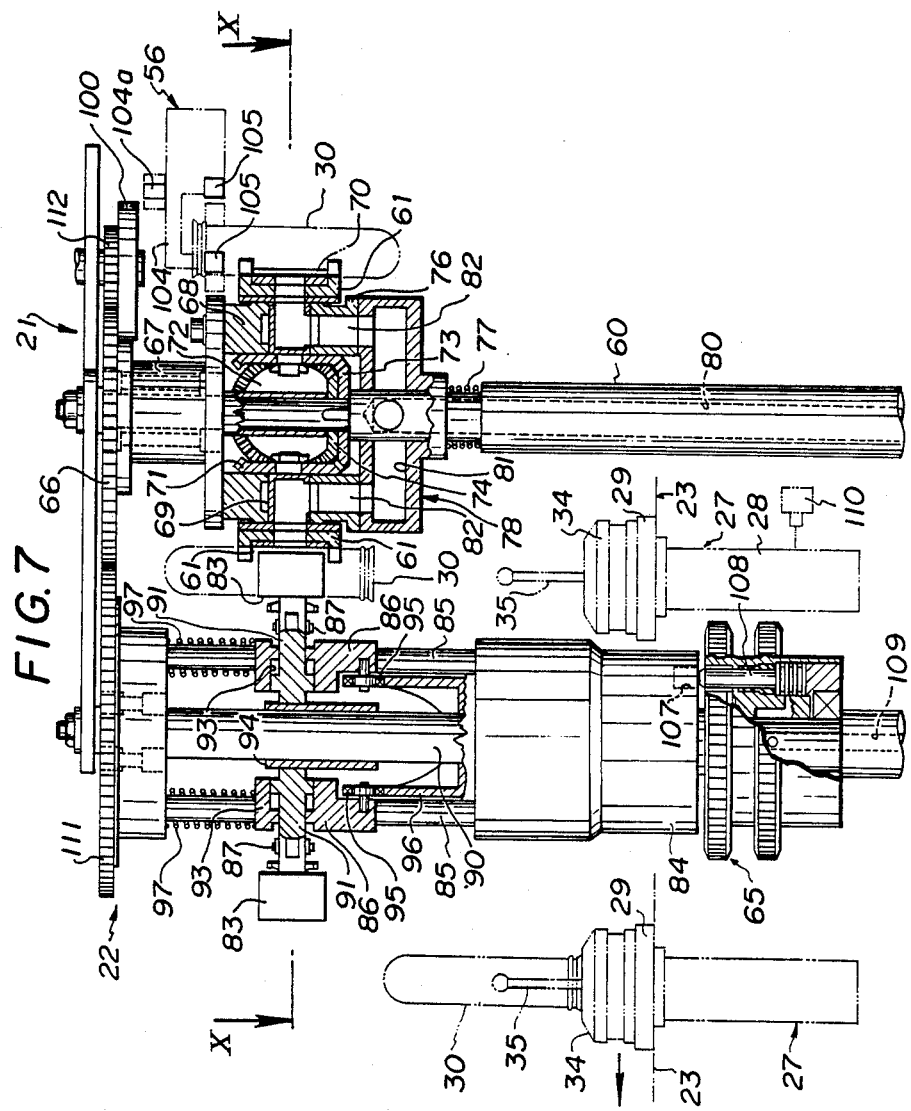

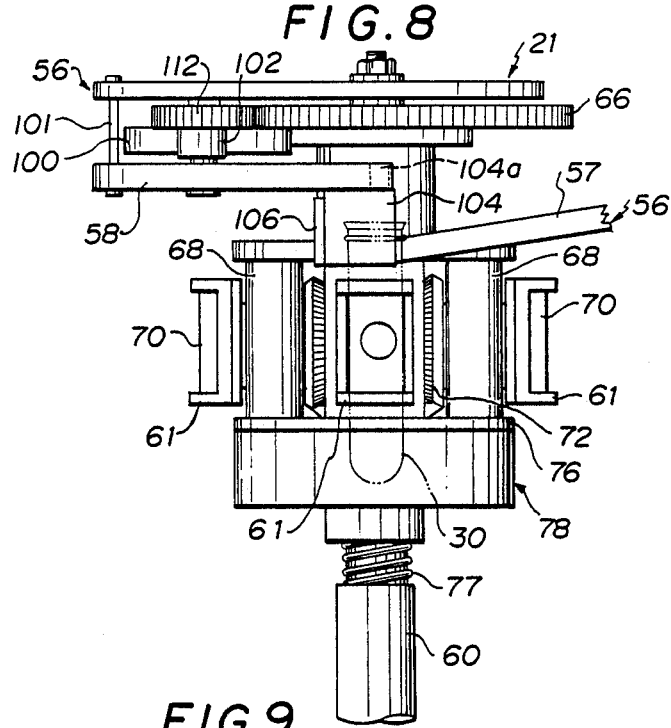
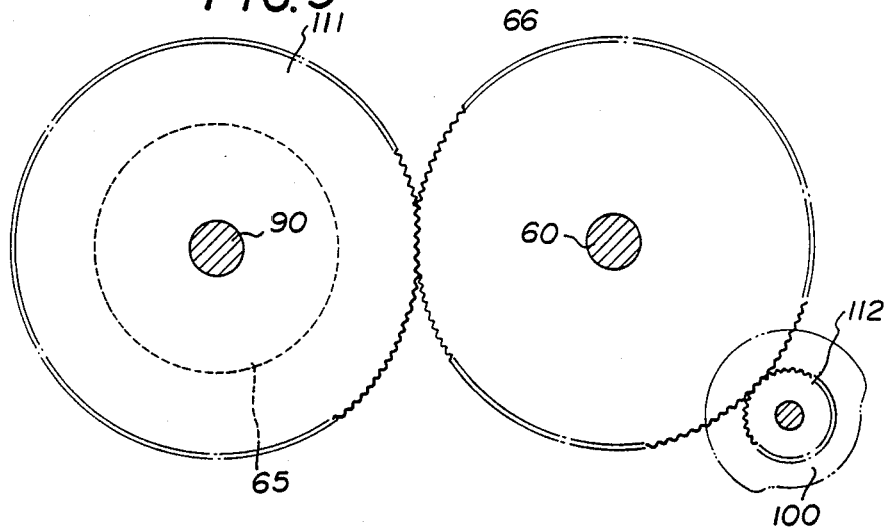

DEVICE FOR SUPPLYING PIECES FOR BLOW-MOLDING CONTAINERS

BACKGROUND OF THE INVENTION

This is a continuation of U.S. Ser. No. 396,264, filed July 8, 1982, now abandoned, which is a continuation of U.S. Ser. No. 253,290, filed Apr. 13, 1981, now abandoned, which in turn is a continuation of U.S. Ser. No. 037,058, filed May 8, 1979, now abandoned.

The present invention relates to a device for supplying pieces for blow-molding containers such as bottle-shaped containers and, more particularly, to a device for supplying cylindrical plastic pieces each with a bottom molded by an injection molding machine one by one to a jig for circulating through the heating and blowing mold of an orientation-blow molding machine.

A transparent thin-walled blow-molded container of biaxially oriented plastic is manufactured by heating a cylindrical piece with a bottom and prefinished neck portion and then biaxially-orienting laterally and longitudinally the piece in a blowing mold. Since a number of the aforesaid pieces are, however, simultaneously molded by an injection molding machine and are then fed at random in various orientations, it is not easy to supply such pieces one by one to a jig to meet the molding speed of an orientation-blow molding machine. Accordingly, the pieces must be heretofore manually supplied to the jig, disabling automation of a container production line.

SUMMARY OF THE INVENTION

The present invention provides a device for supplying pieces for blow-molding containers by the steps of retaining the pieces molded by an injection molding machine and fed at random in various orientations and accumulation, feeding the pieces one by one to meet the molding speed of a blow molding facility, then suspending the pieces with their neck portions directed upwardly and feeding them, then inverting the pieces upside down while supporting them by means of attraction, and clamping the pieces thus inverted to insert them into a jig. Thus, the molding steps of the container can be automated by supplying accurately the inverted pieces one by one to the jig moving near to the pieces at predetermined pitch. The aforementioned jig has a mandrel, a neck support, and an orienting core shaft essentially as disclosed in U.S. patent application Ser. No. 973,439 filed on Dec. 26, 1978, now U.S. Pat. No. 4,233,010. The mandrel is coupled with the connectors of a conveyor for circulating and feeding jigs, a core metal provided in a heater, and a unit for loading pieces from the heater to a blowing mold, etc., and has a cylindrical portion for telescoping the piston of a core shaft. The neck support operates to hold the neck portion of the piece and to hold the piece with the mold of the blow-molding machine. The core shaft operates to longitudinally orient the piece upon lifting of the rod, which is telescoped with a lower cylinder, when the jig is disposed within the mold. The core shaft further has a blowing compressed air introducing groove for radially laterally orienting the piece upon introduction of compressed air thereto. Plastic material which has high crystallinity and rapid crystallizing velocity at molding temperature such as, for example, polyethylene terephthalate is used for the pieces to be supplied according to the present invention. The pieces inserted into and engaged with the jig thus constructed are fed to a piece heating unit by a jig feeding unit to be then uniformly heated for the respective portions of the piece, and are thereafter set sequentially at the mold of a rotary blow-molding machine to be thus biaxially-oriented to a transparent thin-walled bottle-shaped container. After the bottle-shaped container product thus blow-molded is removed from the jig, the latter is fed to the vicinity of the piece of inverter state as described above, and is again circulated back for the next use.

Accordingly, an object of the present invention is to provide a device for aligning and supplying pieces simultaneously molded by an injection molding machine and accumulated and fed at random in various orientations one by one to the next step, meeting the molding velocity of a bottle-shaped container manufacturing orientation-blow molding facility.

Another object of the present invention is to provide a piece feeding unit adapted for the device for supplying the pieces for suspending and feeding the pieces exhausted in an aligned state, in a neck portion upward position to be easily attracted and held.

Yet another object of the present invention is to provide a device for supplying pieces attracted and supported by means of negative pressure with a piece inverting mechanism for inverting the pieces upside down in a neck portion downward position to be easily inserted into a jig.

Still another object of the present invention is to provide a device for supplying pieces of inverted state in a neck portion downward position, having a piece inserting mechanism for clamping the pieces by clamp pawls and releasing the pieces at the position for inserting the pieces into the jig, to drop the pieces toward the jig to enable the jig to insert and engage the pieces thereto.

BRIEF DESCRIPTION OF THE DRAWINGS

The foregoing objects and other objects as well as the characteristic features of the invention will become more apparent and more readily understandable by the following description and the appended claims when read in conjunction with the accompanying drawings.

FIG. 1 is a schematic side view showing the disposition of the respective units of a blow-molding line of a preferred embodiment of the present invention;

FIG. 2 shows side views of bottle-shaped containers showing the transformation thereof from the piece in various positions to final product according to the present invention;

FIG. 5 is a partially enlarged sectional view of the vibrating plate used in the piece aligning unit shown in FIG. 3;

FIG. 6 is a side sectional view similar to FIG. 3 but showing another preferred embodiment of the piece aligning unit according to the present invention;

FIG. 7 is a longitudinally enlarged side view partially in cross section of the piece inverting and inserting mechanisms of the present invention;

FIG. 8 is a side view of the piece inverting mechanism;

FIG. 9 is a plan view showing only the drive unit of the piece inverting and inserting mechanism shown in FIG. 7;

DETAILED DESCRIPTION OF THE PREFERRED EMBODIMENTS

Figure 3:
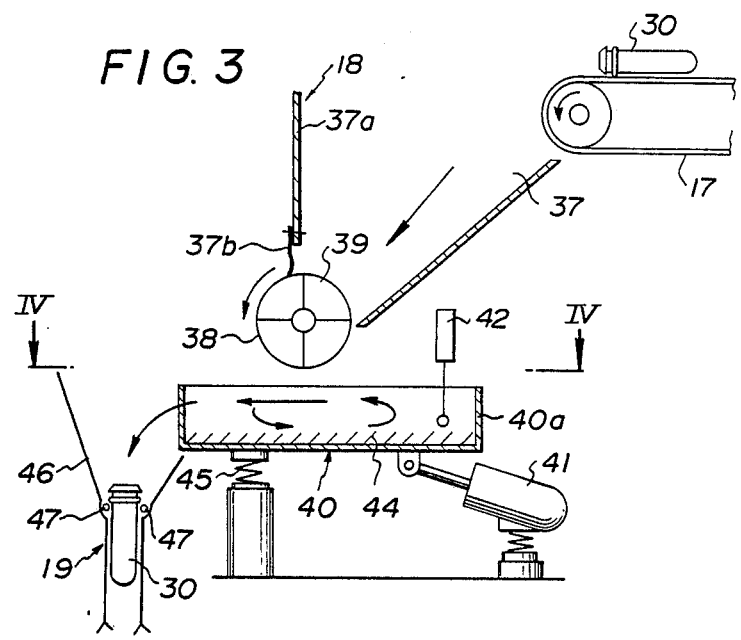
FIG. 3 is a side sectional view of the piece aligning unit used in the blow-molding line according to the present invention.

Referring now to the drawings, particularly to FIG. 1 showing a schematic side view of the bottle-shaped container blow-molding line according to the present invention, wherein like reference numerals designate the same parts in the following views, the container blow-molding line has an injection molding machine 10 with a piece removing unit 11 for automatically removing pieces simultaneously molded by the injection molding machine 10 from the mold of the injection molding machine 10. The gates of the pieces thus removed by the piece removing unit 11 are cut by a gate cutting unit 12 disposed beside the injection molding machine 10, and are then exhausted onto first horizontal conveyor 13. The pieces are then exhausted onto an oblique conveyor 14 extending from the end of the first horizontal conveyor 13, and are cooled to a predetermined temperature of room temperature or lower by the cooling air blown from a cooling air blowing unit 15 while conveyed along the oblique conveyor 14. The pieces are then transferred from the top of the oblique conveyor 14 onto second horizontal conveyor 16, and are than turned in the conveying direction through third horizontal conveyor 17 to the device 20 for supplying the pieces for blow-molding bottle-shaped containers as generally designated by 20 of the present invention. The device 20 has a piece aligning unit 18, a rope conveyor 19, a piece inverting mechanism 21, a piece inserting mechanism 22, and a jig feeding mechanism 23. A number of the pieces simultaneously periodically molded by the injection molding machine 10 are conveyed at random in various orientations and accumulation, and are then exhausted one by one by the piece aligning unit 18 to meet the molding velocity of an orientation-blow molding machine at the following step. The piece exahusted from the piece aligning unit 18 is suspended from the rope conveyor 19 with the prefinished neck portion thereof directed upwardly, and is then conveyed to the piece inverting and inserting mechanisms 21 and 22 through a chute. The piece thus conveyed is inserted and engaged to a jig 27 (FIG. 2) fed by the jig feeding mechanism 23. The piece inserted thus into the jig 27 is uniformly heated while moving through a heating and blowing portion of an orientation-blow molding machine 24, and is biaxially-oriented to be blow-molded for a bottle-shaped container. The bottle-shaped container product thus blow-molded is then removed from the jig 27 by a bottle-shaped container removing unit 25, and is fed to bottle-shaped container inspecting and packaging units (not shown) via fourth horizontal conveyor 26.

Reference is made to FIG. 2, which shows the transformation of the piece in various positions to final bottle-shaped container product. The piece 30 is of a relatively thick-walled cylindrical shape with a bottom, and is simultaneously molded by the mold of the injection molding machine 10 to have a neck end 32 and a flange 33 so as to form a prefinished neck portion 31 with the neck end 32 and the flange 33.

The piece 30 conveyed from the conveyor is directed laterally as laid down on the conveyor as shown in FIG. 2(A). The piece 30 exhausted from the piece aligning unit 18 is supported at the flange 33 thereof via a set of two ropes of the rope conveyor 19 in neck portion 31 upward position as depicted in FIG. 2(B). The piece 30 thus conveyed in neck portion upward position is supplied to the piece inverting mechanism 21, and is inverted in neck portion downward position by the piece inverting mechanism 21. The piece 30 thus inverted in neck portion downward position is inserted and engaged to the jig 27 by the piece inserting mechanism 22 as illustrated in FIG. 2(C).

The jig 27 has a cylindrical mandrel 28, a circular disk 29 to be engaged to the attachment of the jig feeding mechanism 23, a neck support 34, and an orienting core shaft 35 extended upwardly from the mandrel 28. The piece 30 biaxially blow molded by the orientation-blow molding machine 24 to a bottle-shaped container 36 is expanded at the body and bottom thereof as shown in FIG. 2(D).

The device 20 for supplying the pieces for blow-molding a bottle-shaped container of the present invention will now be described with regard to the respective constituent units in detail.

Figure 4:
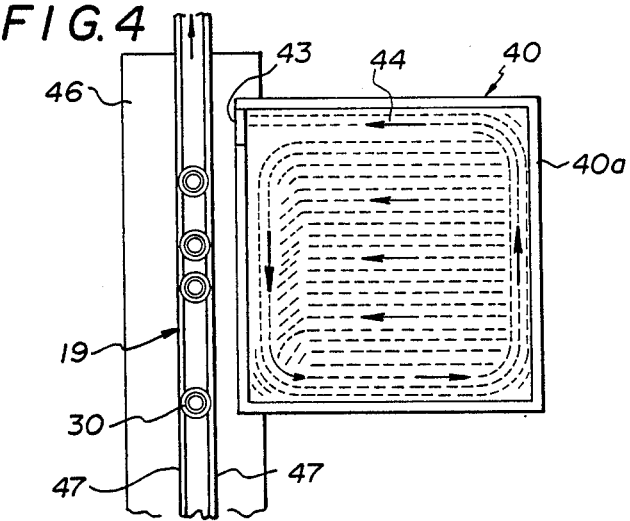
FIG. 4 is a plan view of the piece aligning unit as seen from the line IV—IV in the direction as designated by arrows in FIG. 3.

FIGS. 3 through 5 show the piece aligning unit 18 used for the device 20 of the present invention. The piece aligning unit 18 has a hopper 37 for receiving the pieces conveyed at random in various orientations opened at the end of the third horizontal conveyor 17. A control roller 38 intermittently rotating is laterally installed at the bottom of the hopper 37. A piece aligning plate or table 40 is disposed under the control roller 38 with a vibration generator 41 attached underneath the table 40. The control roller 38 has a plurality of small chambers 39 to drop the pieces 30 entered into each of the small chambers 39 from the hopper 37 to the aligning table 40 in accordance with the rotation of the control roller 38. A gap is provided between the lower edge of one sidewall 37a facing opposite to the third horizontal conveyor 17 of the hopper 37 and the control roller 38. Ag flexible skirt member 37b is suspended from the lower edge of the side wall 37a of the hopper 37 for lightly restricting the pieces 39 filled in the small chambers of the rotating control roller 38. The control roller 38 does not continuously rotate but intermittently rotates according to the accumulated state of the pieces 30 dropped onto the aligning table 40. More particularly, a sensor 42 is disposed over the aligning table 40 for detecting the vertically superimposed pieces 30 on the table 40. The control roller 39 is stopped upon reception of the signal from the sensor 42. The sensor 42 allows the control roller 38 to rotate when the pieces 30 are flowed at predetermined intervals onto the aligning table 40.

The piece aligning plate or table 40 has a peripheral wall 40a with an outlet 43 formed at the side of the rope conveyor 19. Pile hairs 44 formed of a flexible material such as rubber or plastic are closely implanted on the upper surface of the table 40 in an inclined position in a predetermined direction at a slight oblique angle as shown in FIG. 5. The table 40 is supported at one side thereof via a spring 45 and is vibrated in a two-dimensional manner longitudinally and elevationally by the operation of the vibration generator 41. The pile hairs 44 implanted on the upper surface of the table 40 are regularly obliquely directed, for example, as indicated by arrows in FIG. 4. As can be seen in FIG. 4, the pile hairs 44 at the center of the table 40 are inclined in the same direction, and the hairs at the periphery of the table are implanted to circulate the pieces along the periphery toward outlet 43, which is slightly wider than the pieces. When the table 40 is vibrated by the vibration generator 41, the respective pile hairs 44 are elevationally and longitudinally rocked to feed the pieces 30 on the table 40 in the direction toward the inclined direction of the pile hairs 44 while the piece 30 is aligned longitudinally at its own axis on the table 40 as shown in an enlarged view in FIG. 5. That is, the piece 30 does not roll along its round cross sectional body but is gradually slidably fed along the longitudinal axis thereof with maximum moving resistance against the pile hairs 44, to be sequentially exhausted from the outlet 43 of the table 40.

Another hopper 46 is provided beside the outlet 43 of the table 40. Two ropes 47 of the rope conveyor 19 are arranged in parallel at the bottom of the hopper 46. Since the ropes 47, 47 of the rope conveyor 19 are installed at an interval slightly larger than the outer diameter of the body of the piece 30, the pieces 30 thrown into the hopper 46 are sequentially engaged at the flanges 33 thereof between the ropes 47 and 47 with the result that they are conveyed along the rope conveyor 19 in neck portion 31 upward position as suspended from the ropes 47, 47.

FIG. 6 shows another preferred embodiment of the piece aligning unit having piece reserving means 48 provided between the third horizontal conveyor 17 and the hopper 37. The piece reserving means 48 has a box 50, in which buffer material for preventing the piece 30 from damage is lined on the internal walls thereof. A fulcrum pin 49 for tiltably supporting the box 50, a bracket 51 integrally provided onto the bottom of the box 50, and a telescopic cylinder 52 for telescoping a piston rod 53 as provided under the bracket 51 are also present.

In the modified embodiment shown in FIG. 6, the pieces 30 conveyed via the third horizontal conveyor 17 are temporarily reserved within the box 50. The cylinder 52 is operated to extend the piston rod 53 telescoped thereinto in response to the molding velocity of the biaxial-orientation blow-molding machine 24 to tilt the box 50 to thus supply the pieces 30 into the hopper 37. The pieces 30 are thereafter aligned longitudinally, are sequentially engaged from the outlet 43 of the piece aligning table 40 with the rope conveyor 19, and conveyed in neck portion upward position as suspended from the ropes 47, 47 of the rope conveyor 19 to the next piece inverting mechanism 21 and further to the piece inserting mechanism 22 in the same manner as in the piece aligning unit shown in FIG. 4.

Figure 10:
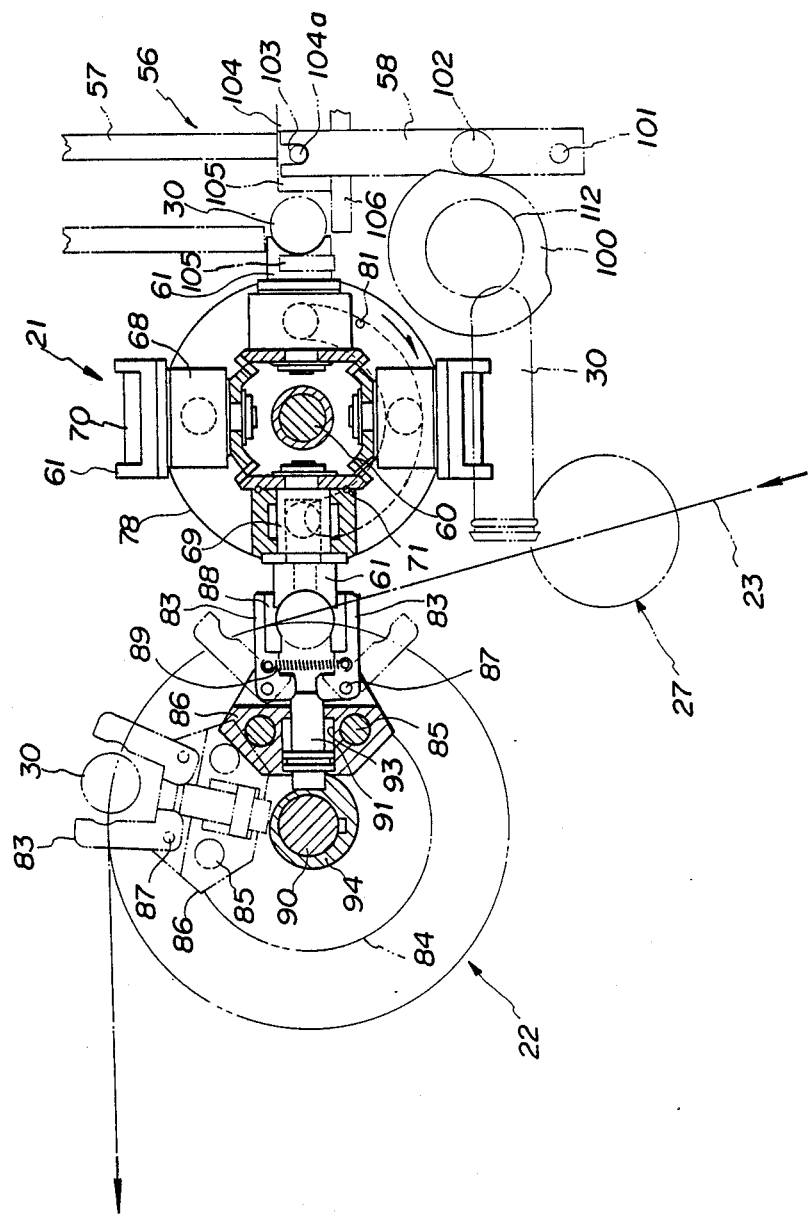
FIG. 10 is a plan view of the piece inverting and inserting mechanisms as seen from the line X—X in the direction as designated by arrows in FIG. 7.
Figure 11:
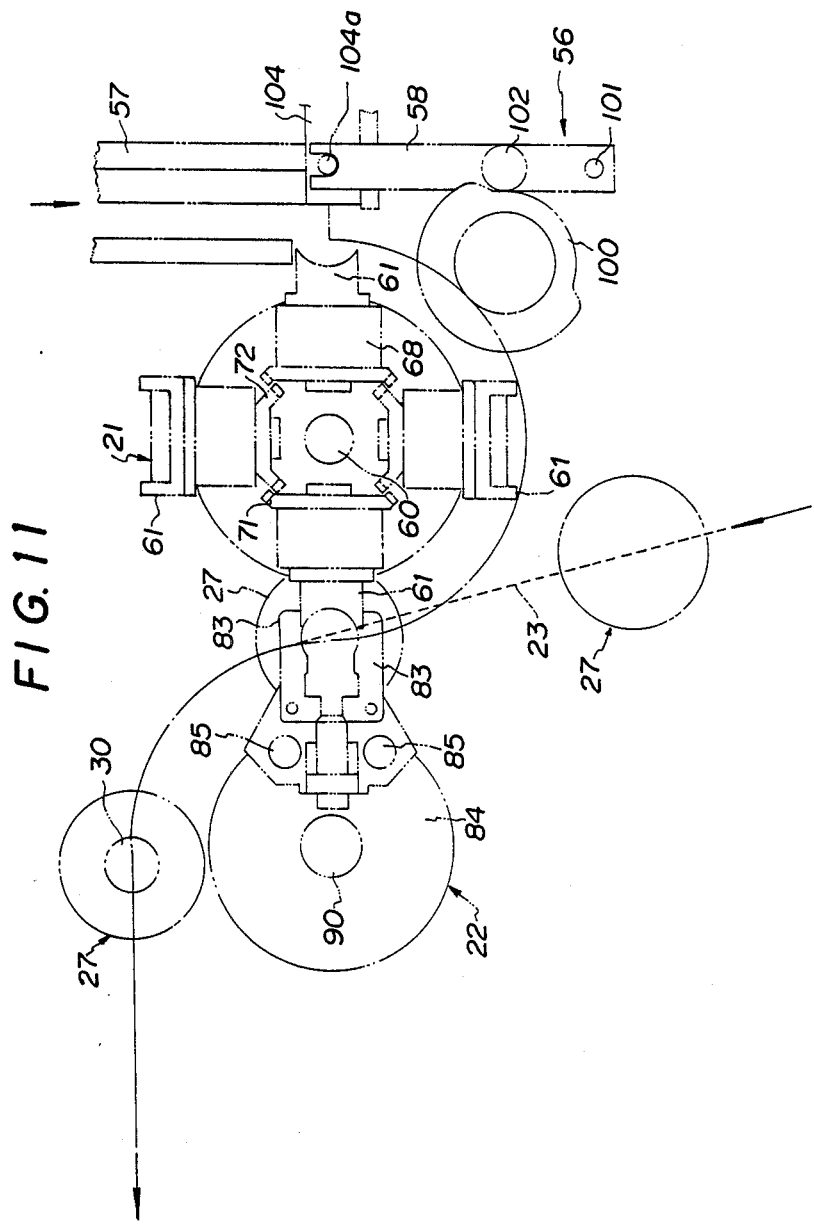
FIG. 11 is a plan view showing the relationship between the piece moving trace and the jig feeding route in the device for supplying the pieces for blow-molding containers according to the present invention.

A piece supplying unit 56 is provided at the conveying end of the rope conveyor 19 as shown in FIGS. 7, 8 and 10. The piece supplying unit 56 has a piece supply chute 57 for guiding the pieces 30 conveyed out of the rope conveyor 19, and a piece inserting lever 58 for slidably inserting the piece 30 advanced to the supply chute end into the inserting position of the piece inverting mechanism 21 by a cam operation. The detailed configuration and operation of the piece supplying unit 56 will be described later.

The pieces 30 thus supplied to the piece supplying unit 56 are then fed to the piece inverting and inserting mechanisms 21 and 22. The piece inverting mechanism 21 operates, as shown in FIGS. 7 through 11, to attract the pieces 30 supplied from the piece supplying unit 56 and to hold them therewith, and to invert them upside down in neck portion downward position while turning the pieces 30 180° in a horizontal plane. The piece inverting mechanism 21 has a vertical shaft 60 fixed to the center thereof, and four sets of holders 61 provided at the vertical shaft 60 for attracting the bodies of the pieces 30 to hold them therewith by means of negative pressure. The respective holders 61 of the piece inverting mechanism 21 are provided circumferentially at every 90° around the vertical shaft 60, and are stepwisely turned at 90° in such a manner that they are rotated around their own axes to invert the position of the piece 30 to a neck portion downward position from the piece holding position during the two step rotation.

FIG. 7 shows an example with the piece supplying unit 56 located at the upper right portion for supplying the pieces 30, which are attracted and held sequentially by the holders 61, and are inverted upside down in neck portion downward position at the position rotated 180° around the shaft 60 as a center to thus attain the position to be fed to the clamp pawls 83 of the piece inserting mechanism 22.

A rotary frame 67 is rotatably assembled integrally with the inversion gear 66 of a drive unit 65, which will be described hereinafter in greater detail, at the top of the vertical shaft 60. Four bearing blocks 68 are secured at 90° of central angle to the lower surface of the collar provided at the bottom of the rotary frame 67.

Four rotary shafts 69 are rotatably assembled with the respective bearing blocks 68 along the same circumference of the vertical shaft 60 as a center at the axes thereof, and the holders 61 are secured to the ends of the respective rotary shafts 69.

Each of the holders 61 holds each of the pieces 30 supplied from the piece supplying unit 56 in contact via a contactor 70 formed of elastic and soft material such as rubber or the like secured thereto therewith.

Bevel inversion gear 71 or 72 is secured to the internal ends of opposite pairs of the four rotary shafts 69 for supporting the respective holders 61 at the ends thereof in mesh with either of stationary gears 73 and 74, having the same number of teeth, secured to the rotary shafts 60.

The respective bearing blocks 68 are secured at their lower ends to a slide ring plate 76 to bear the lifting force of an air evacuation block 78 always caused by a spring 77 through the slide ring plate 76.

As particularly shown in FIGS. 7 and 10, an air evacuation hole 81 of substantially semi-circumferential shape is formed within the air evacuation block 78 to communicate with an air evacuation passage 80 formed within the vertical shaft 60 along the shaft 60 at one side and to also communicate through the slide ring plate 76 with holes 82 perforated in the respective bearing blocks 68 at the bottom. Holes 82 in turn communicate through the holes opened at the center of the contactors 70 with holes perforated correspondingly at the respective rotary shaft 69.

Since the air evacuation hole 81 thus formed within the air evacuation block 78 is formed in the range from the piece supplying position to the position for feeding the pieces 30 to the piece inserting mechanism 22 in semi-circumferential extent, the vacuum operation of a vacuum pump (not shown) connected to the air evacuation passage 80 is imparted only to the holder or holders 61 rotatably disposed to the position of the range from the piece supplying position to the position for feeding the pieces 30 to the piece inserting mechanism 22.

As is readily obvious from FIG. 10, the reason for having the cross sectional area of the holes 81 and 82 at the position for feeding the pieces 30 to the piece inserting mechanism 22 smaller than that at the other position is that the holding force of the holder 61 for holding the piece 30 is weakened at the position for feeding the piece 30 to the piece inserting mechanism 22 to feed the piece 30 from the holder 61 to a pair of clamp pawls 83 in order to preferably feed the piece 30 smoothly from the holder 61 to the clamp pawls 83.

As is readily clear in the preferred embodiment shown in FIGS. 7 and 10, the inversion gears 71 and 72 of different diameter are kept in mesh with opposite pairs of the respective rotary shafts 69 via the vertical shaft 60 and are also engaged in mesh with the stationary gears 71 and 72 respectively, of the same number of teeth and different diameter from each other. This is because, if the inversion gears of the same diameter are staying in mesh with the respective rotary shafts 69, the adjacent inversion gears mutually interfere with each other to disable the performance of the desired rotating operation. Thus, the diameters of the inversion gears are made different in order not to interfere with the inversion gears secured to the adjacent rotary shafts 69.

It is noted that the inversion gear 71 and the stationary gear 73 staying in mesh with the inversion gear 71 must have the same number of teeth, and the inversion gear 72 and the stationary gear 74 staying in mesh with the inversion gear 72 must similarly have the same number of teeth.

The jig feeding mechanism 23 is disposed under the position where the piece 30 is thus inverted upside down in neck portion downward position. The jigs 27 supported via the attachments of a chain are sequentially conveyed at predetermined pitch to the jig feeding mechanism 23 as was heretofore described. The pieces 30 are then sequentially inserted into the respective jigs 27 by the operation of the piece inserting mechanism 22.

The piece inserting mechanism 22 operates to clamp the piece 30 inverted in neck portion downward position via the clamp pawls 83, to move along the moving trace of the jigs 27, and to downwardly move to insert and engage the piece 30 held therewith to the jig 27.

More particularly, a rotary gyro 84 is rotatably but elevationally stationarily mounted at the lower portion of the vertical shaft 90 fixedly secured in parallel to the vertical shaft 60 in vertical position. A predetermined number of guide poles 85 (four sets of 8 guide poles in the embodiment shown) are set up and secured to the rotary gyro 84.

Base gyros 86 are elevationally movably assembled at every 90° of central angle around the vertical shaft 90 as a center at the respective guide poles 85, and have each a set of two clamp pawls 83 for clamping the piece 30 therebetween.

As particularly shown in FIG. 10, each of the clamp pawls 83 has two pawls facing oppositely with each other and horizontally outwardly and inwardly rockably journaled at the base ends thereof via a rockable pin 87 in the vicinity of the front surface of the base gyro 86, elastic pieces 88 formed of elastic material such as rubber or the like mounted on the inside facing front halves of the pawls 83 to make direct contact with the piece 30, and tension springs 89 mounted between the base and the pawls for always inwardly rocking the pawls to approach therebetween.

A push pin 91 is projected toward the base ends of the pawls 83 thus journaled with the rockable pin 87, and is inserted slidably into the slide hole 93 perforated at the base gyro 86 to be slidably in radial direction from the shaft 90 as a center. The push pin 91 is further urged onto the cam surface of a cam 94 secured to the vertical shaft 90 at the base end surface, namely the base end projected from that facing with the vertical shaft 90, of the base gyro 86.

As also is obvious from FIG. 10, when the base gyros 86 rotate integrally with the rotary gyro 84 and the guide poles 85 around the vertical shaft 90 to the position for clamping the pieces 30, the cam 94 is rotated to allow the push pin 91 to be radially retarded toward the vertical shaft 90 mostly to cause the clamp pawls 83, 83 to be approached to each other to enable them to clamp the piece 30. As the base gyros 86 rotate from such position around the vertical shaft 90, the push pin 91 is moved radially outwardly from the vertical shaft 90. When the base gyros 86 further rotate from the position for clamping the piece 30 via the pawls 83, 83 by desired central angle (about 80° in the preferred embodiment shown in FIG. 10) to the position for inserting the piece 30, the cam 94 is so rotated as to gradually increase the distance from the center of the shaft 90 to the cam surface in order to release the holding operation of the piece 30 by the clamp pawls 83. The cam 94 is so formed at the cam surface thereof as to attain the state for opening the clamp pawls 83, 83 almost immediately before the clamp pawls 83, 83 clamp the piece 30 as the base gyros 86 are rotated further around the vertical shaft 90.

Referring back to FIG. 7, a cam roller 95 is mounted under the base end of each of the base gyros 86. The base gyros 86 are always urged downwardly toward the cam roller 95 by a coil spring 97 engaged around the guide pole 85 and accordingly toward the elevation cam 96 secured to the vertical shaft 90.

The base gyros 86 allow the cam roller 95 to always be urged onto the cam surface of the elevation cam 96 by the downward compression force of the coil spring 97 to downwardly move to insert and engage the piece 30 held by the clamp pawls 83 to the jig 27 when rotating from the position for clamping the piece 30 to the position for inserting the piece 30 around the vertical shaft 90 and upwardly move to the original height when further rotating around the vertical shaft 90 to the position for clamping the piece 30.

It is advantageous that, since the moving trace of the piece 30 inserted into the piece inserting mechanism 22 completely coincides with the intermittent moving trace of the jig 27 in the range from the position slightly past the position for clamping the piece 30 to the next intermittent stopping position slightly past the position for inserting the piece 30 in the preferred embodiment shown in FIG. 7, and is directly above the moving trace of the jig 27, the piece 30 can be inserted by the piece inserting mechanism 22 anywhere when both of the moving traces are completely coincident. Thus the position for inserting the piece 30 to the jig 27 need not always be strictly fixed.

It is noted that, although the elevational movements of the base gyros 86 and the opening and closing operations of the clamp pawls 83 are executed by the cam in the preferred embodiment shown, they may be conducted at predetermined timing, for example, by a hydraulic cylinder with its piston rod telescoped therewith.

It is also noted that, though the cam 94 and the elevation cam 96 are constructed differently in the exemplified embodiment shown, both may be formed integrally by replacing the cam roller 95 with a cam pin and engaging the cam pin with the cam groove formed thereon.

There is provided the piece supplying unit 56 for supplying the piece 30 to the piece inverting mechanism 21 as was heretofore described. As particularly shown in FIG. 10, the piece supplying unit 56 operates to supply the pieces 30 one by one at predetermined intervals from the piece supply chute 57 for continuously conveying the pieces 30 of upward neck portion attitude by means of a slope to the holders 61 advanced to the position for attracting and holding the piece 30.

More particularly, the piece supplying unit 56 has a piece inserting cam 100 rotating once while the holders 61 of the piece inverting mechanism 21 are stepwisely rotated at 90°, and a piece inserting lever 58, which is rockably engaged with a fulcrum pin 101. The piece inserting lever 58 has a follower roller 102 formed at the center thereof and is always urged toward the piece inserting cam 100 by a spring (not shown) or the like. The piece inserting lever 58 has a slide groove 103 cut at the end thereof together with the follower roller 102. A movable pin 104a is projected from the top of an inserting gyro 104 held rectilinearly movably along the imaginary rectilinear line connected from the center of the vertical shaft 60 to the piece supplying position, and is engaged with the slide groove 103 of the piece inserting lever 58 to slidably move the inserting gyro 104 by the rocking movements of the piece inserting lever 58 as a center in accordance with the rotation of the piece inserting cam 100.

The inserting gyro 104 is extended from the piece supply chute 57 to have two hooks 105, 105 for holding the piece 30, disposed at the position for inserting the piece 30.

When the inserting gyro 104 holds the piece 30 disposed at the position for inserting the piece 30 via both the hooks 105, 105 and slidably moves towards the holders 61, one of the hooks 105 of the inserting gyro 104 is disposed at the position for inserting the piece 30 thereby to prohibit the piece 30 to be fed from the supply chute 57 to the position for inserting the piece 30.

A stopper 106 is secured to the opposite side of the end of the piece supply chute 57 with respect to the inserting gyro 104 to exactly stop the piece 30 slidably moved down through the supply chute 57 at the position for inserting the piece 30 as shown in FIG. 8.

Referring now to FIGS. 7, 9 and 10, the drive unit 65 receives the drive force from a main drive unit for intermittently moving the jigs 27 circulating in the biaxial-orientation blow-molding machine 24, and drives the piece inverting and inserting mechanisms 21 and 22 and the piece supplying unit 56 at predetermined intervals with the drive force.

More particularly, drive sprockets are rotatably mounted at the lower end of the vertical shaft 90 to be driven by the drive force from the main drive unit.

The drive sprockets have a connecting pin 108 which is inserted into a pin hole 107 opened at the lower surface of the drive sprockets in a cylindrical structure by the operation of hydraulic fluid.

The connecting pin 108 is operated to project by means of the hydraulic fluid supplied in accordance with the detection signal of a detector 110 for detecting the jig 27 exactly disposed at a suitable position through a vent passage 109 formed at the vertical shaft 90.

A drive gear 111 is rotatably secured to the upper end of the vertical shaft 90 in mesh with the inversion gear 66 of the same number of teeth as that rotatably secured to the upper end of the vertical shaft 60.

As shown in FIG. 9, the inversion gear 66 stays in mesh with a cam gear 112 for driving the piece inserting cam 100 with one-fourth of the number of the teeth thereof.

When the jigs 27 are intermittently fed according to the operation of the drive unit 65 and are stopped in the vicinity of the position for clamping the piece 30, detector 110, utilizing a photoelectric tube, a limit switch, etc., opens a valve (not shown) in accordance with the detection signal from the detector 110 to thus supply hydraulic fluid through the vent passage 109 to then advance the connecting pin 108 into the pin hole 107 of the rotary gyro 84 to finally connect the drive sprocket integrally to the rotary gyro 84 (around the vertical shaft 90 as a center with respect to the rotating direction).

When the jigs 27 start feeding when the connecting pin 108 is inserted into the pin hole 107 of the rotary gyro 84, the sprocket is rotated synchronously with the feeding of the jigs 27 to thereby rotate the rotary gyro 84, drive gear 111, and inversion gear 66 at 90° of central angle and the cam gear 112 at one revolution.

When the cam gear 112 is thus rotated, the inserting gyro 104 of the piece supplying unit 56 slidably moves to urge the piece 30, conveyed to the position for supplying the same, toward the holder 61. The inserting gyro 104 is slidably moved at such a timing that it is advanced to urge the piece 30 toward the holder 61 immediately before the holder 61 is stopped at the position for supplying the piece 30 and, after the holder 61 is completely displaced from the position for supplying the piece 30, it is returned to the original position before the following holder 61 is advanced to the position for supplying the piece 30.

Since the holes 82 are communicated with the air evacuation passage 80 simultaneously when the holder 61 is thus stopped at the position for supplying the piece 30, the piece 30 thus urged is held by the holder 61 by the attracting force of the vacuum operation.

The connecting pin 108 is returned at the initial time of the stopping period of the holder 61 to thereby allow the insertion of the drive sprocket into the pin hole 107 of the rotary gyro 84. However, before the next piece 30 is held by the holder 61, the connecting pin 108 is advanced to be inserted into the pin hole 107 of the rotary gyro 84 upon detection of the jig 27 by the detector 110 to thereby connect the drive sprocket to the rotary gyro 84.

The holder 61 holding the piece 30 by the next operation inverts the piece 30 upside down in neck portion downward position during the stepwise rotation around the vertical shaft 60.

As shown in FIG. 10, since the cross sectional area of the air evacuation hold 81 and the hole 82 is reduced when the holder 61 is stopped at the position for clamping the piece 30, the holding force of the piece 30 by the holder 61 is weakened.

The holder 61 is rotated around the vertical shaft 90 to clamp the piece 30 via the clamp pawls 83, 83 simultaneously when the holder 61 is stopped.

When the next intermittent operation in turn starts, the clamp pawls 83 remove the piece 30 from the holder 61 against the holding force of the holder 61 and rotate around the vertical shaft 90 and simultaneously move down to simultaneously gradually release the clamp pawls 83, 83, releasing the holding of the piece 30 to insert the piece 30 into the jig 27 moving immediately under the piece 30 along the same moving trace before reaching the next stopping position. The following jig 27 becomes the state for clamping the piece 30 advanced to the next position for clamping the piece 30 during this operation.

It should be understood from the foregoing description that the device for supplying the pieces for blow-molding containers of the present invention can continuously convey the pieces molded by the injection molding machine, and can sequentially supply the pieces one by one accurately to the biaxiallyorientation blow-molding machine to meet the molding velocity of the blow-molding machine.

Although the specific embodiments of the present invention have been described hereinbefore, it should be understood that numerous variations thereof may be employed without departing from the invention, and it is reiterated that the examples given as above are simply illustrative of the device for supplying the pieces for blow-molding containers.

We claim:

1. Apparatus for supplying semi-sphericalbottomed cylindrical plastic pieces having an open neck end to jigs on which said pieces circulate through a blow-molding machine, said apparatus comprising:

piece supplying means, piece inverting means, jig feeding means, jig conveying means and a single means for intermittently driving both said piece inverting means and said jig feeding means, wherein:

said piece supplying means is adapted to supply said semi-spherical bottomed pieces in a neck end upward position to said piece inverting means;

said piece inverting means is adapted to grasp said pieces from said piece supplying means at portions of said pieces which will form a portion of a finished blow-molded product, invert said pieces 180° to a neck end downward position and supply said pieces to said jig feeding means;

said inverting means comprises a holding member for holding said pieces, means for inverting said holding member and means for transferring said holding member from a piece pick up position to a piece delivery position, said holding member transferring means comprising a rotating mechanism for horizontally rotating said holder member from said piece pick up position to said piece delivery position during inversion of said holding member by said holding member inverting means;

said jig feeding means is adapted to deliver said pieces from said piece inverting means to said jigs; and said jig conveying means is adapted to circulate said jigs past said jig feeding means and through said blow-molding machine.

2. Apparatus for supplying semi-spherical-bottomed cylindrical plastic pieces having an open neck end to jigs on which said pieces circulate through a blow-molding machine, said apparatus comprising:

piece supplying means, piece inverting means, jig feeding means and jig conveying means, wherein:

said piece supplying means is adapted to supply said semi-spherical bottomed pieces in a neck end upward position to said piece inverting means;

said piece inverting means is adapted to grasp said pieces from said piece supplying means at portions of said pieces which will form a portion of a finished blow-molded product, invert said pieces 180° to a neck end downward position and supply said pieces to said jig feeding means;

said inverting means comprises a holding member for holding said pieces, means for inverting said holding member and means for transferring said holding member from a piece pick up position to a piece delivery position, said holding member transferring means comprising a rotating mechanism for horizontally rotating said holding member from said piece pick up position to said piece delivery position during inversion of said holding member by said holding member inverting means; said piece inverting means further comprises a vacuum source and a passage, and said holding member comprises an aperture; said vacuum source being in fluid communication with said passage, and said aperture being movable into fluid communication with said passage and hence with said vacuum source, said aperture being in only partial fluid communication with said passage when said holding member is in said piece delivery position;

said jig feeding means is adapted to deliver said pieces from said piece inverting means to said jigs; and said jig conveying means is adapted to circulate said jigs past said jig feeding means and through said blow-molding machine.

3. Apparatus for supplying semispherical-bottomed cylindrical plastic pieces having an open neck end to jigs on which said pieces circulate through a blow-molding machine, said apparatus comprising:

piece supplying means, piece inverting means, jig feeding means and jig conveying means, wherein:

said piece supplying means is adapted to supply said semi-spherical bottomed pieces in a neck end upward position to said piece inverting means;

said piece inverting means is adapted to grasp said pieces from said piece supplying means at portions of said pieces which will form a portion of a finished blow-molded product invert said pieces 180° to a neck end downward position and supply said pieces to said jig feeding means;

said inverting means comprises a holding member for holding said pieces, means for inverting said holding member and means for transferring said holding member from a piece pick up position to a piece delivery position, said holding member transferring means comprising a rotating mechanism for horizontally rotating said holding member from said piece pick up position to said piece delivery position during inversion of said holding member by said holding member inverting means;

said jig feeding means is adapted to deliver said pieces from said piece inverting means to said jigs and comprises a rotatable vertically reciprocal, openable and closable pair of clamp pawls and driving means for horizontally-rotatably and downwardly moving said pair of clamp pawls for delivering said pieces from said holding member to said jig, and activator means activated by a jig detector for activating said jig feeding means; and said jig conveying means is adapted to circulate said jigs past said jig feeding means and through said blow-molding machine.

4. Apparatus as claimed in claim 3, further comprising a spring means for urging said pair of clamp pawls closed and wherein said jig feeding means comprises a movable pin means for opening said pair of clamp pawls against the force of said spring means.

5. Apparatus as claimed in claim 4, further comprising cam means for controlling movement of said pin means.

6. Apparatus as claimed in claim 3, further comprising a cam for controlling vertical reciprocation of said pair of clamp pawls.

7. Apparatus as claimed in claim 3 or claim 4, wherein:
said holding member is horizontally rotated by said rotating mechanism through an arc of about 180° during piece inversion, and said pair of clamp pawls is horizontally rotated through an arc of about 90° to insert said piece in said jig.

8. An apparatus as claimed in claim 3, wherein said activator means comprises a reciprocable pin and said driving means is provided with an aperture for receiving said reciprocable pin.

9. A method for use in an apparatus supplying preforms onto jigs which circulate said performs through a blow-molding machine, the method wherein:
semi-spherical-bottomed cylindrical plastic preforms having an open neck end are supplied in a neck end upward position to a preform inverting means;
said preform inverting means holds said preforms at portions thereof which will form a portion of a finished blowmolded product, inverts said preforms 180° to a neck end downward position and rotates horizontally during said inversion to supply said preforms at a preform delivery position to a jig feeding means;
and said said jig feeding means delivers said preforms from said preform inverting means to jigs at said preform delivery position;
wherein said preform inverting means holds said performs by means of vacuum suction, and said suction is reduced upon arrival of said preforms at said preform delivery position.

* * * * *